United States Patent [19]
Caraway

[11] 3,756,714
[45] Sept. 4, 1973

[54] PINCH ROLLER ASSEMBLY
[75] Inventor: Guy C. Caraway, Downey, Calif.
[73] Assignee: Technicolor, Inc., Hollywood, Calif.
[22] Filed: May 14, 1971
[21] Appl. No.: 143,448

[52] U.S. Cl.................... 352/27, 226/90, 352/72
[51] Int. Cl............................................ G03b 31/02
[58] Field of Search .................. 352/27, 29, 26, 72; 226/89, 90, 180

[56] References Cited
UNITED STATES PATENTS

| | | | |
|---|---|---|---|
| 3,027,112 | 3/1962 | Flan | 226/25 |
| 3,096,920 | 7/1963 | Schoeber | 226/180 X |
| 3,656,761 | 4/1972 | Laschenski | 226/180 |
| 3,319,858 | 5/1967 | Schober et al. | 226/90 |

Primary Examiner—Robert P. Greiner
Attorney—Lyon & Lyon

[57] ABSTRACT

There is disclosed herein a capstan and pinch roller assembly for use in moving material in strip form, such as for moving motion picture film in a cartridge-loaded motion picture projector. The pinch roller is pivotally mounted and normally remains in a rest position for allowing entry of a film cartridge or the like into the machine. Insertion of the cartridge into the machine engages a member of the pinch roller assembly to move the roller into a second position, from which it is then moved to a final, capstan-engaging, position by means of an electromagnet. The electromagnet thus serves to finally position the roller, and to properly bias the pinch roller against the capstan. A suitable sound pick-up, such as an optical or magnetic pick-up, also may be positioned by movement of the pinch roller assembly.

This invention relates to apparatus for moving webs of strips of material and more particularly to an improved pivotally mounted pinch roller assembly for use with cartridge loaded motion picture projectors and the like.

4 Claims, 5 Drawing Figures

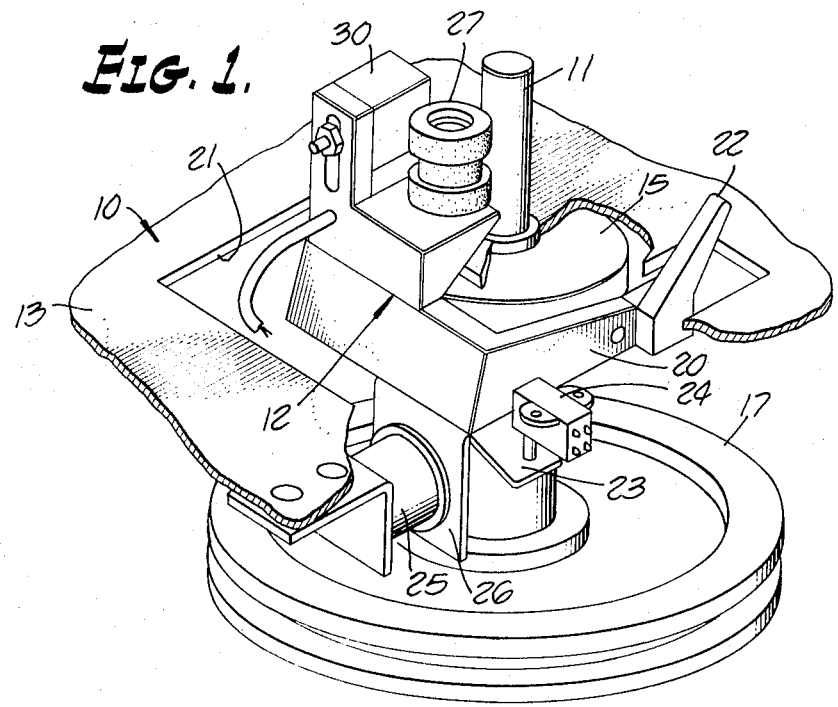
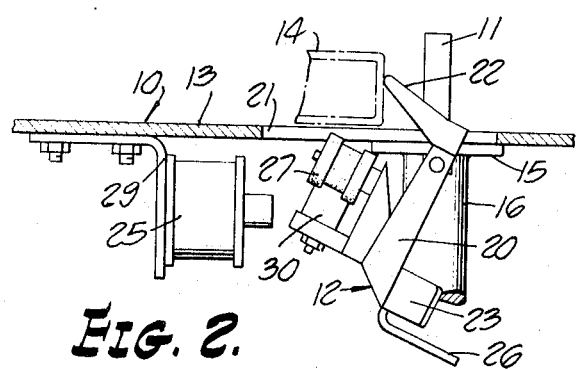
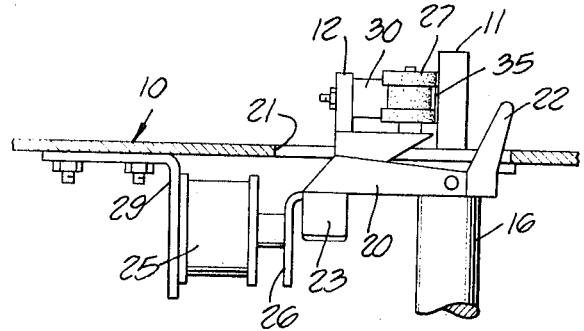
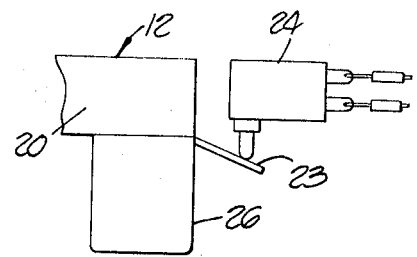
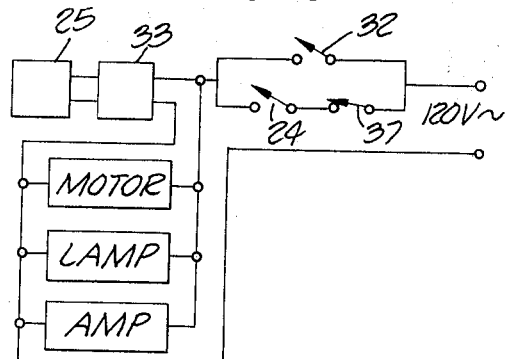
INVENTOR.
GUY C. CARAWAY
BY
Lyon & Lyon
ATTORNEYS

PINCH ROLLER ASSEMBLY

CROSS REFERENCE TO RELATED APPLICATIONS

Reference is made to application Ser. No. 1183 filed Jan. 7, 1970, in the name of E. Robak and entitled "CAPSTAN SCRAPER", now U.S. Pat. No. 3,642,365 and U. S. Patent No. 3,568,943. Said application discloses a cartridge-loaded motion picture projector employing a pivotally mounted pinch roller to which the concepts of the present invention are applicable. Said patent discloses a motion picture film cartridge of the type usable with said projector and with a projector utilizing the pinch roller assembly of the present application. The disclosures of the said application and said patent are incorporated herein by reference.

The construction of various types of continuous loop cartridges, such as that disclosed in said patent above, is such that certain components of the projector are normally required to swing out of the way upon removal of the cartridge from the projector. For example, such cartridges include a forward film plane along which the film moves. The film must be properly engaged with a driving means, such as a film claw; and where sound film is involved, continuous motion of the film also must be provided at least past the sound pickup. The capstan normally is mounted in a fixed location within the projector to engage the forward surface of the film but, inasmuch as the cartridge is a removable entity, this presents difficulties in properly locating and engaging a pinch roller with the back surface of the film adjacent the capstan. For this reason, some motion picture projectors, such as that described in said above application, employ a pivotally mounted capstan which is normally maintained in a position to allow entry of the cartridge, but which pivots to cause the pinch roller to engage the back surface of the film upon full entry of the cartridge into the projector. However, as is well known to those skilled in the art the pinch roller must exert a minimal force after insertion of the cartridge and maintain this force so as to properly move the film for sound pick-up.

Accordingly, it is a principal object of the present invention to provide an improved pinch roller assembly.

An additional object of this invention is to provide a new pinch roller assembly wherein a pinch roller is biased toward a capstan by an electromagnetic force.

A further object of this invention is to provide a pivotally mounted pinch roller assembly wherein a pinch roller and capstan are biased toward one another by an electromagnetic force.

An additional object of this invention is to provide a pinch roller and capstan assembly for cartridge loaded motion picture projectors wherein the roller and capstan are biased together by means of an electromagnet.

These and other objects and features of the present invention will become better understood through a consideration of the following description taken in conjunction with the drawing in which:

FIG. 1 is a perspective view of a pinch roller and capstan assembly according to the teachings of the present invention;

FIG. 2 is a partial cross sectional view showing the pinch roller assembly pivoted to a rest or unlatched position;

FIG. 3 is a partial cross sectional view showing the pinch roller pivoted to its operative or latched position;

FIG. 4 is a partial view of a switch and switch acctuator arm of the pinch roller assembly; and FIG. 5 is a circuit diagram of the energizing circuit for the electromagnet.

Briefly, the present invention involves a pinch roller and capstan assembly for a cartridge loaded motion picture projector, or the like, wherein the capstan preferably is in a fixed position and the pinch roller assembly is pivotally mounted to swing toward a capstan-engaging position. Initial movement of the assembly is occasioned by insertion of a film cartridge, and final positioning of the assembly and biasing of the roller toward the capstan is provided by means of an electromagnet. It will be understood that the capstan could be movable and the roller assembly fixed instead but this arrangement is less preferable.

Turning now to the drawings, a mounting plate 10 of a projector is shown having a rotatable drive capstan 11 extending upwardly therethrough and a pinch roller assembly 12 pivotally mounted thereon. The upper surface 13 of the plate 10 serves as the bottom support and guide for a motion picture cartridge 14, only the forward portion being shown in dotted lines in the FIG. 2.

The capstan 11 is mounted in a bearing housing 15 which is affixed to the underside of the plate 10. A drive shaft 16 (FIG. 2) portion of the capstan 11 extends downwardly and is coupled to a flywheel 17, it being understood that either the shaft 16 or flywheel 17 is driven by an electrical motor in a conventional manner.

The pinch roller assembly 12 includes a chassis or body 20 which is pivotally mounted to the underside of the plate 10. The plate 10 includes an aperture 21 through which the assembly 12 swings. A finger 22 extends upwardly from the body 20 and enables initial pivoting and positioning of the pinch roller assembly 12 when the finger 22 is engaged by the cartridge 14. A switch actuating tab 23 also is carried by the body 20 of the assembly 12 for actuating a switch 24 which in turn enables an electromagnet 25 to be energized as will be described in more detail subsequently. When the electromagnet 25 is energized, it attracts and armature 26 depending from the body 20 so as to position the assembly 12 in its final position with a rotatable pinch roller 27 biased toward the capstan 11 as seen in FIG. 3. The pinch roller 27 is rotatably mounted on the body 20. The electromagnet 25 is secured to the underside of the plate 10 by a suitable bracket 29, and the switch 24 may be secured to the underside of the plate 10 by screws, not shown. The body 20 of the assembly 12 may also carry a sound pick-up 30. A magnetic sound pick-up is shown, but an optical pick-up likewise may be used.

A normally-open push button switch 32 (FIG. 5), or momentary-close switch, is connected in parallel with the switch 24, and this parallel combination is connected in series with the electromagnet or holding coil 25 and a suitable power source as seen in FIG. 5. In this manner, after the cartridge is inserted fully into the projector, the pinch roller 27 is almost biased toward the capstan, and depression of the push button switch 32 energizes the electromagnet 25 through a rectifier 33 which in turn attracks the armature 26 thereby causing the pinch roller 27 to engage film 35 against a capstan 11 as seen in FIG. 3. The rectifier 33 may include diodes to rectify the ac and a capacitor to reduce ripple so as to reduce or prevent buzzing of the electromagnet 25. Inasmuch as the push button 32 is a momentary-close switch, it need not be held since the switch 24 now maintains the electromagnet 25 energized in as much as the finger 23 maintains the switch 24 closed when the pinch roller assembly 12 is in the latched position as shown in FIG. 3, thus, the switch 24 serves as an energizing switch for the coil 25 whether or not the push button 32 remains depressed, the unit is turned off, and the electromagnet 25 deenergized by opening a normally-closed "off" switch 37.

The present embodiments of this invention are to be considered in all respects as illustrative and not as restrictive, the scope of the invention being indicated by the appended claims rather than by the foregoing description. All changes which come within the meaning and range of equivalency therefore are intended to be embraced therein.

I claim:

1. A pinch roller and capstan assembly for use in moving a web of material such as sound motion picture film in a cartridge loaded motion picture projector comprising mounting means, a rotatable capstan mounted on said mounting means, pinch roller means including a pinch roller, said pinch roller means including a body, said pinch roller being rotatably mounted on said body and said body being pivotally mounted on said mounting means for allowing pivotal movement of said pinch roller toward said capstan for engaging and moving said film, the pivot axis of said pinch roller means being transverse to the axis of said capstan, and said pinch roller means including an armature coupled with said body, electromagnetic means mounted between said mounting means and said armature for attracting said armature and holding said pinch roller toward said capstan, and said body for said pinch roller means including a sound pick-up mounted thereon and pivotally movable therewith for engaging said film.

2. A pinch roller and capstan assembly for use in moving a web of material such as for moving film in a cartridge loaded motion picture projector comprising mounting means, a rotatable capstan mounted on said mounting means, pinch roller means including a pinch roller, said pinch roller means including a body, said pinch roller being rotatably mounted on said body and said body being pivotally mounted on said mounting means for allowing pivotal movement of said pinch roller toward said capstan for engaging and moving said web of material, the pivot axis of said pinch roller means being transverse to the axis of said capstan, and said pinch roller means including an armature coupled with said body, electromagnetic means mounted between said mounting means and said armature for attracting said armature and holding said pinch roller toward said capstan, and said web of material has stored therein sound information, and said body for said pinch roller means includes a sound pick-up mounted thereon and pivotally movable therewith for engaging said material.

3. A pinch roller and capstan assembly for use in moving a web of material such as sound motion picture film in a cartridge loaded motion picture projector comprising mounting means, a rotatable capstan mounted on said mounting means, pinch roller means including a pinch roller, said pinch roller means including a body, said pinch roller being rotatably mounted on said body and said body being pivotally mounted on said mounting means for allowing pivotal movement of said pinch roller toward said capstan for engaging and moving said film, the pivot axis of said pinch roller means being transverse to the axis of said capstan, and said pinch roller means including an armature coupled with said body, electromagnetic means mounted between said mounting means and said armature for attracting said armature and holding said pinch roller toward said capstan, and said body for said pinch roller means including a sound pick-up moutned thereon and pivotally movable therewith for placement adjacent said film.

4. A pinch roller and capstan assembly for use in moving a web of material such as for moving film in a cartridge loaded motion picture projector comprising mounting means, a rotatable capstan mounted on said mounting means, pinch roller means including a pinch roller, said pinch roller means including a body, said pinch roller being rotatably mounted on said body and said body being pivotally mounted on said mounting means for allowing pivotal movement of said pinch roller toward said capstan for engaging and moving said web of material, the pivota axis of said pinch roller means being transverse to the axis of said capstan, and said pinch roller means including an armature coupled with said body, electromagnetic means mounted between said mounting means and said armature for attracting said armature and holding said pinch roller toward said capstan, and said web of material has stored therein sound information, and said body for said pinch roller means includes a sound pick-up mounted thereon and pivotally movable therewith for placement adjacent said material.

* * * * *